United States Patent [19]
Seron

[11] 3,979,795
[45] Sept. 14, 1976

[54] DECORATIVE EYEGLASS HOLDER
[75] Inventor: Suren V. Seron, Joliet, Ill.
[73] Assignee: Seron Manufacturing Company, Joliet, Ill.
[22] Filed: Feb. 7, 1975
[21] Appl. No.: 547,986

[52] U.S. Cl. .............................. 24/3 C; 24/81 AD; 24/73 SA; 351/157
[51] Int. Cl.² ..................... A44B 21/00; G02C 3/00
[58] Field of Search .......... 24/3 C, 81 AD, 9, 3 BR, 24/73 SA; 351/157

[56] References Cited
UNITED STATES PATENTS

| | | | |
|---|---|---|---|
| 2,481,946 | 9/1949 | Pendleton | 24/3 C X |
| 2,649,020 | 8/1953 | Wheeler | 24/3 C X |
| 2,819,650 | 1/1958 | Seron | 24/3 C |
| 2,820,269 | 1/1958 | Wolff | 24/9 |
| 2,835,945 | 5/1958 | Hilsinger | 24/3 C |
| 2,911,694 | 11/1959 | Seron | 24/3 B X |

Primary Examiner—Robert L. Wolfe
Assistant Examiner—Andrew M. Calvert
Attorney, Agent, or Firm—Wegner, Stellman, McCord, Wiles & Wood

[57] ABSTRACT

A decorative eyeglass holder of the type worn around the neck to suspend spectacles and including a long band. A pair of one-piece molded clasps are interlinked via the band and each has an elongated slot extending through a flexible head portion to receive a temple of the eyeglasses, a neck portion for attachment with the band, and an annular recess intermediate said head and neck portions. A hollow and spherical clamp depends from a connection with the recess to generally encompass the neck portion and to coact with the neck portion in fastening the band and clasp together.

9 Claims, 7 Drawing Figures

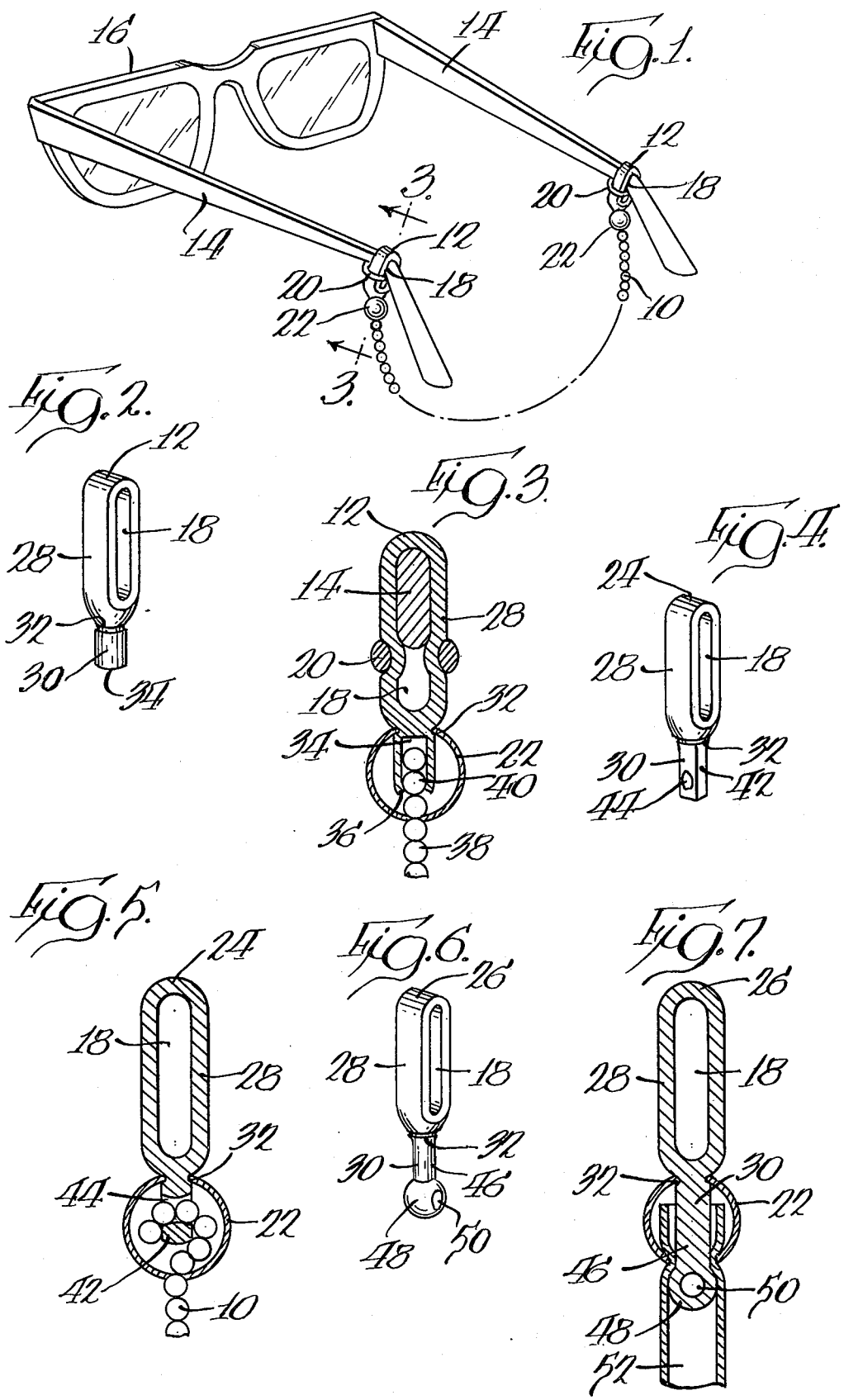

DECORATIVE EYEGLASS HOLDER

BACKGROUND OF THE INVENTION

This invention relates to a decorative eyeglass holder for suspending the eyeglasses from the neck when they are not being used.

In certain prior art eyeglass holders, a long chain was passed around the neck of the wearer and connected to a pair of metal snap fasteners which held loops for attachment to the eyeglass temples. The snap fasteners, besides damaging the temples, often snagged clothing and pulled hair. In addition, the loops attached poorly to the eyeglass temples.

In others, an elastic loop was used for the attachment to the temples of the spectacles. The elastic loop had a sufficient elasticity to fit over the enlarged end of a temple but yet upon contraction it gripped the temple adequately. However, this type of loop lost its elasticity eventually because of the continuous stretching. Moreover, the elastic loop was connected to the long chain around the neck via a metal holder wiht a protruding hook with a ring passing through the chain lodged in the eye of the hook. The metal holder often had sharp edges to scratch the wearer and the protruding hook could easily pull hair or snag clothing. The hook could also be bent open to allow the uncoupling of the holder and chain.

SUMMARY OF THE INVENTION

It is a primary object of the invention to provide a decorative eyeglass retainer which prevents accidental damage to the eyeglasses and its temples while supporting the eyeglasses around the neck of the wearer by means of a clasp and chain in which the interlinking of the same avoids sharp edges and protrusions resulting in pulled hair, snagged clothing and the uncoupling of the clasp and chain.

Another object of the invention is to provide a decorative eyeglass holder which has a one-piece molded clasp that attaches to the eyeglass temple at one end and to the chain at the other end.

A further object of the invention is to provide a decorative eyeglass holder which eliminates the necessity of a ring between the clasp and chain, and in which the clasp and chain are directly connected to one another in a protective enclosure that further secures the clasp and chain together without sharp edges or protrusions.

In accordance with the present invention, a decorative eyeglass holder of the type for supporting eyeglasses around the neck of the wearer when they are not in use, includes a long band interlinking a pair of one-piece molded clasps. Each clasp has an elongated slot extending through a flexible head portion to receive an eyeglass temple. A neck portion of the clasp engages the band. An annular recess is intermediate the head and neck portions. A hollow spherical clamp depends from a connection with the recess to generally encompass the neck portion for fastening the band and clasp together without sharp edges or protruding parts.

According to a further feature of the invention, the neck portion of the clasp is a flexible hollow cylinder with an inwardly tapered opening at the bottom. The long band is a beaded chain. A number of beads on the chain are inserted into the hollow neck and are retained therein by the taper. The hollow spherical clamp which depends from the annular recess encompasses all of the neck and then pinches inwardly against the linkage between two beads hanging down from the tapered opening to further secure the band and clasp together.

In another feature of the invention, the neck portion of the clasp has a rectangular shape with a eyelet toward the bottom edge thereof. A length of the beaded chain is threaded through the eyelet to hold the remainder of the chain extending downwardly therefrom. The hollow spherical clamp encompasses all of the rectangular neck portion and it further secures the clasp and chain together as described above for the fastening of the neck portion.

In still another feature of the invention, the neck portion of the clasp has a solid cylindrical finger shape which terminates in a bulbous tip with an eyelet. The band is a hollow cord which forms a sleeve to slide over the bulbous tip and the rest of the finger. The hollow spherical clamp depends from the annular recess to encompass the part of the hollow cord over the finger and then is pinched inwardly just above the bulbous tip and closely adjacent thereto to fasten the hollow cord around the bulbous tip.

Preferably, the clasps of the invention are a one-piece molded part of a flexible material like plastic or rubber. In addition, the clasp has a generally needle-shaped head ad neck portion. A slider ring, one on each head portion, is used for adjusting the effective length of the elongated slots to match the girth of the inserted eyeglass temple for a snug attachment thereto.

Other objects and advantages will be apparent from the following description taken in connection with the accompanying drawings.

BRIEF DESCRIPTION OF THE DRAWINGS

FIG. 1 is a perspective view illustrating an eyeglass holder embodying the invention attached to a pair of spectacle temples;

FIG. 2 is a perspective view of the clasp thereof;

FIG. 3 is a sectional view thereof taken along line 3—3 of FIG. 1, illustrating the connection between the clasp and a beaded chain;

FIG. 4 is a perspective view of a modified embodiment of a clasp;

FIG. 5 is a sectional view thereof illustrating the connection between the clasp and beaded chain;

FIG. 6 is a perspective view of a further embodiment of a clasp; and

FIG. 7 is a sectional view thereof, illustrating the connection between the clasp and a hollow cord.

DESCRIPTION OF THE PREFERRED EMBODIMENTS

One embodiment of the decorative eyeglass holder for suspending a pair of eyeglasses from the neck of the wearer when they are not being used made according to the invention is illustrated in FIG. 1, and includes a band 10 which is a beaded chain. The beaded chain 10 interlinks a pair of flexible clasps 12 which are attached to a pair of temples 14 of the eyeglasses 16 via elongated slots 18. A pair of slider rings 20, one on each clasp 12, adjusts the effective length to the slot 18 to match the girth of the eyeglass temple 14. A metal and hollow spherical clamp or ferrule 22 connects the band 10 and each clasp 12 by being crimped thereon.

In the preferred embodiment of the present invention, as shown in FIGS. 2, 4 and 6, the clasps 12, 24 and 26, respectively, are a one-piece molded and flexible part of plastic or the like which consists of a needle-shaped head 28 and neck 30 with an annular recess 32 intermediate the head 28 and neck 30. The head 28 of the clasps 12, 24 and 26 are identical in size and shape, and each clasp has the elongated slot 18 extending through the head portion of the clasp for receiving a spectacle temple 14 as seen in FIGS. 1 and 3. However, the neck portion 30 of each clasp mentioned varies in shape and in its means of connection to the band 10.

Turning now to FIGS. 2 and 3, the neck 30 of clasp 12 is a hollow cylinder 34 with an inwardly tapered opening 36 at its bottom. The beads 38 of the chain 10 are larger in diameter than the tapered opening 36. The beads 38 are inserted into the cylinder 34 by forcing the tapered opening 36 to expand while pushing a bead 38 against it. Upon contraction of the tapered opening 36 around the last-inserted bead 40, the inserted beads 38 are retained within the cylinder 34 by the inward taper of the opening 36. The hollow spherical clamp or ferrule 22 depends from a connection with the annular recess 32 to encompass the neck 30 of clasp 12 and pinches inwardly against the linkage between two beads to further secure the beaded chain and clasp together. The clamp 22 completely encloses the clasp and chain connection and its spherical shape leaves no sharp edges and protrusions to catch hair or tear the clothing of the wearer.

In addition, the taper of the opening 36 serves as a means for holding the band 10 and clasp 12 together while the ferrule 22 is being crimped around the band and clasp as described above in the final step of assembly.

Referring now to FIGS. 4 and 5, the neck 30 of clasp 24 has a generally rectangular shape 42 with an eyelet 44 toward the bottom edge of the neck 30. The beaded chain 10 is threaded through the eyelet 42. The diameter of the eyelet 42 can be made so that the beads 38 are frictionally engaged by the sides of the eyelet to hold the chain and clasp together. Again, the clamp (ferrule) 22 is connected to the clasp 24 and chain 10 in a similar manner as described for the clasp 12. Thus the threaded chain 10 and clasp 24 connection is enclosed by the spherical clamp 22. Moreover, the eyelet 46 serves as another means for holding the band and clasp together during the final step of assembly which is the crimping of the ferrule 22 around the band and clasp as described above.

Finally, in FIGS. 6 and 7, the neck 30 of clasp 26 has a solid cylindrical finger 46 shape which terminates in a bulbous tip 48 with an eyelet 50. The band 10 is a hollow cord 52 which forms a sleeve that is slipped over the bulbous tip 48 and finger 46. The hollow spherical clamp 22 depends from the annular recess 32 to enclose the part of the cord 52 over the finger 46 and then pinches inwardly adjacent the bulbous tip 48 to fasten the hollow cord around the tip. The bulbous tip 48 frictionally engages the sleeve and further serves as a means for holding the band and clasp together in the final assembly of the eyeglass holder when the ferrule is crimped around the band and clasp as described above. Furthermore, the eyelet 50 of the bulbous tip 48 can be utilized as previously described and shown in FIGS. 4 and 5 with the ferrule 22 likewise encompassing the bulbous tip 48 when assembled. Here, also, the connection of the clasp 26 and cord 52 eliminates the sharp edges and protrusions which pull hair and snag clothing.

I claim:

1. A decorative eyeglass holder of the type for suspending eyeglasses from the neck of the wearer when they are not in use having a long band; a pair of one-piece clasps interlinked by said band, each having a slot extending through a flexible head portion to receive an eyeglass temple, a neck portion for engaging said band, and an annular recess intermediate said head and neck portions; a substantially hollow clamp clampingly engaging said recess and encompassing said neck portion and coacting therewith for fastening the band and clasp together.

2. The decorative eyeglass holder of claim 1 wherein said band is a beaded chain or the like.

3. The decorative eyeglass holder of claim 2 wherein said neck portion is a flexible hollow cylinder with an inwardly tapered opening at the bottom for inserting a number of beads to be held therein, said clamp totally encompassing the neck portion and pinching tightly inwardly between two beads to further secure the band and clasp together without sharp edges or protrusions.

4. The decorative eyeglass holder of claim 2 wherein each said neck portion includes an eyelet, the ends of said beaded chain being threadably received in a corresponding one of said eyelets, each said clamp totally encompassing a corresponding one of the neck portions and the chain end threaded through the corresponding eyelet, each said clamp gripping the corresponding end of the chain by crimped ends pinching inwardly against the chain between beads thereon to fasten the band and clasp together without sharp edges or protrusions.

5. The decorative eyeglass holder of claim 1 wherein said neck portion has a solid finger terminating in a bulbous tip, said band is a hollow cord with ends which define sleeves, each of said sleeves being received over the bulbous tip and finger of a respective neck portion, each said clamp encompassing the corresponding sleeve over the finger and pinching inwardly thereon adjacent the bulbous tip to fasten the cord around the tip without sharp edges or protrusions.

6. An eyeglass holder of the type worn around the neck of the wearer, comprising:
a long band or the like;
a pair of flexible clasps connected to opposite ends of the band, each having a head and neck portion;
an elongated slot extending through said head portion for inserting an eyeglass temple;
means on said neck portion for temporarily holding the band and clasp together during permanent assembly thereof;
a hollow ferrule crimpingly engaging and encompassing said neck portion to coact therewith in the permanent assembly of the band and clasp without sharp edges or protrusions.

7. The eyeglass holder of claim 6 in which said temporary holding means includes a hollow in the neck portion terminating in a inwardly tapered opening, said band being inserted into said hollow through said tapered opening and held thereby during the assembly of said ferrule.

8. The eyeglass holder of claim 6 in which said temporary holding means includes an eyelet in said neck portion threadably receiving a length of said band.

9. The eyeglass holder of claim 6 in which each said temporary holding means includes a bulbous tip on a corresponding one of said necks, and wherein said band comprises an elongated length of flexible material having hollow ends, each said hollow end being frictionally received on a corresponding one of said bulbous tips.

* * * * *